S. N. BARUCH.
ELECTRIC CABLE PROTECTING APPARATUS.
APPLICATION FILED OCT. 23, 1916.

1,270,362.

Patented June 25, 1918.

WITNESS
J. B. Gardner

INVENTOR.
S. N. BARUCH
BY White Prost
HIS ATTORNEYS

UNITED STATES PATENT OFFICE.

SYDNEY N. BARUCH, OF SAN FRANCISCO, CALIFORNIA.

ELECTRIC-CABLE-PROTECTING APPARATUS.

1,270,362.     Specification of Letters Patent.     Patented June 25, 1918.

Application filed October 23, 1916. Serial No. 127,129.

*To all whom it may concern:*

Be it known that I, SYDNEY N. BARUCH, a citizen of the United States, and a resident of the city and county of San Francisco, State of California, have invented a certain new and useful Electric-Cable-Protecting Apparatus, of which the following is a specification.

The invention relates to an apparatus for protecting an electric cable or an insulated electric conductor from the effects of excessive voltage, whether potential or static.

An object of the invention is to provide an apparatus for protecting the cable against high static charges due either to the capacity effect of the cable or lightning and other phenomena.

A further object of the invention is to provide means for protecting apparatus connected to the cable circuit from the disastrous effects of high static charges and surges.

A further object of the invention is to provide means for protecting the cable against excessive charging voltages.

The invention possesses other advantageous features, some of which, with the foregoing, will be set forth at length in the following description where I shall outline in full that form of the invention which I have selected for illustration in the drawings accompanying and forming part of the present specification. In said drawings I have shown only one specific form of the apparatus of my invention, but it is to be understood that I do not limit myself to such form, since the invention may be embodied in a plurality of forms without departing from the spirit of the invention as expressed in the claims.

Figure 1:
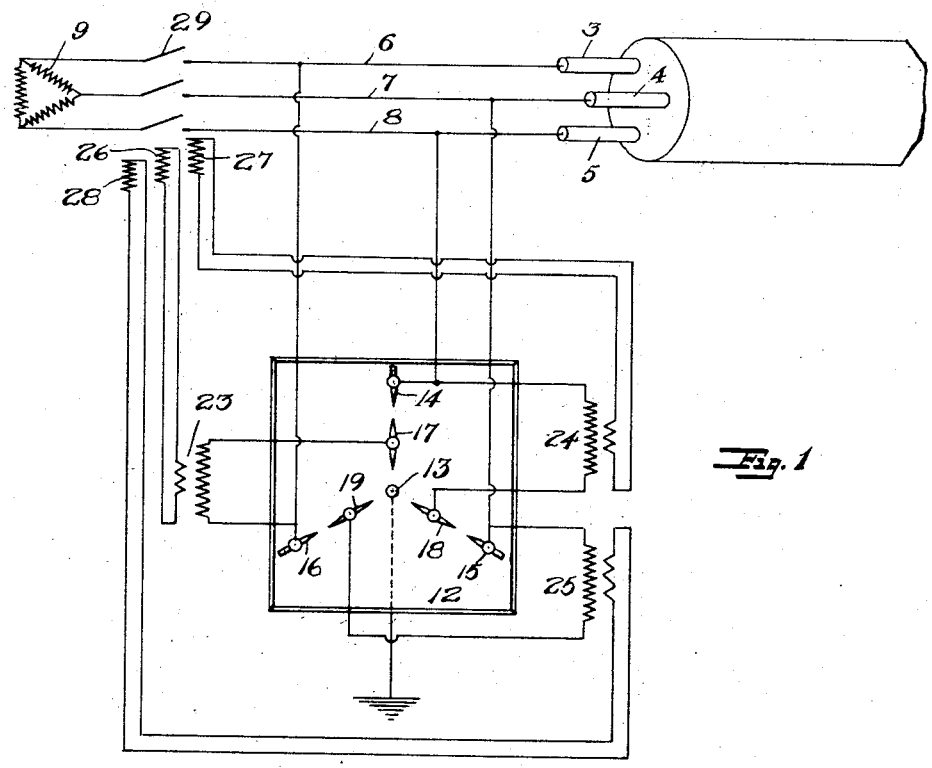
Figure 1 is a diagrammatic representation of one form of the apparatus of my invention.
Figure 2:
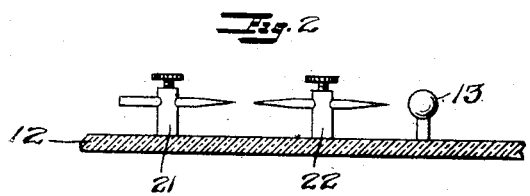
Fig. 2 is a sectional detail of a portion of the apparatus.

Herein I shall refer to the device as a cable protector, but it is to be understood that the expression *cable* includes cables having one or more conductors and insulated current-carrying conductors.

The apparatus of my invention is intended to relieve the cable of excessive potential differences between the conductors of the cable and also between any conductor and the ground. These potential differences are usually either of a static nature and are due to the electro-static capacity of the cable or to atmospheric conditions or to an excessive charging voltage.

In the drawing I have shown diagrammatically a cable 2 having three conductors 3, 4 and 5 for carrying a three-phase alternating current, the cable conductors being connected by means of the leads or conductors 6, 7 and 8 with the source of power 9.

The apparatus comprises a suitable base or panel 12 of insulating material upon which are fixed conducting elements spaced apart by air gaps. These conducting elements preferably comprise a central element 13 which is preferably spherical in shape and which is grounded. Surrounding the central element and spaced apart therefrom are conducting elements 14, 15, 16, which point toward the central element and which are preferably pointed on that end which is adjacent the central element to facilitate the discharge of static electricity therefrom. Arranged intermediate each of the outside conducting elements 14, 15, 16 and the central element 13, are intermediate conducting elements 17, 18, 19, preferably pointed on both ends and alined with the outside elements and the central element. The intermediate elements are spaced apart from both the outside and the central elements and the distances between the outside elements and the intermediate elements are equal, and the distances between each intermediate element and the central element are also equal. Each outside conducting element is longitudinally adjustable in a post 21 and each intermediate element is similarly mounted in a post 22, so that the lengths of both air gaps may be varied.

The outer conducting elements 14, 15, 16 are respectively connected to the line conductors 8, 7, 6. The intermediate conductors 17, 18, 19, are respectively connected through the primaries of the transformers 23, 24, 25, with the outer conducting elements 16, 14, 15, so that the gap between the outer and intermediate conducting elements is interposed between each two of the line conductors. The secondaries of the transformers 23, 24, 25, are connected in series with solenoid coils 26, 27, 28 which may be superposed or arranged in any desired relation and the solenoid core is connected to an oil switch 29 in the main line. There is therefore interposed between each cable conductor and the ground, two air gaps in series and between each two conductors, one air gap and a transformer inductance. The length of the air gap between the outer and intermediate conductors is such that its dielectric strength is less than the dielectric strength of the insulation between any two cables of the conductor and is preferably of such length that it will be bridged by a current of slightly greater potential than the normal overload potential rating of the cable. The combined length of the two air gaps in series between the outer conductor and the grounded conductor is such that the dielectric strength of the two gaps is less than the dielectric strength of the insulation between any one conductor and the cable sheath.

The operation of the apparatus to protect the cable against excessive potential differences between the conductors due to the line voltage is as follows: When the potential increases above the safe value, the current discharges across the air gap between the outer and intermediate conductors, for instance 14 and 17, and passes through the primary of transformer 23 to the conductor 16 which is connected to cable conductor 3. The current in the transformer 23 energizes solenoid 26 and thereby opens the switch 29, disconnecting the cable from the source of power.

When the potential difference between a conductor and the sheath increases above the safe value, due to the condenser effect of the cable or to high atmospheric static charges, the high potential static current discharges across the inner and outer air gaps to the ground; for instance, from conductor 14 to conductor 17 to conductor 13. The discharge of the static current over the outer air gap breaks down the resistance of the gap and forms a bridge over which the line current flows to the conductor 17 and thence through the transformer opening the main line switch. The static discharge will not pass through the transformer on account of the high frequency of the static discharge and only the line current passes through the transformer.

I claim:

1. The combination with an electric circuit including an electric cable, a circuit connecting one cable conductor to ground, three spaced conductors in said ground circuit whereby two air gaps in series are formed, a local circuit connecting the intermediate spaced conductor with a second cable conductor and means for opening the cable circuit connected to the local circuit.

2. The combination with an electric circuit including an electric cable, comprising a grounded circuit connected to one cable conductor and having two gaps in series therein, a circuit connected to said grounded circuit intermediate the gaps and to a second cable conductor, a transformer having its primary in said last named circuit and means in the transformer secondary circuit for opening the cable circuit.

In testimony whereof, I have hereunto set my hand at San Francisco, California, this 28th day of September, 1916.

SYDNEY N. BARUCH.

In presence of—

H. G. PROST.

Copies of this patent may be obtained for five cents each, by addressing the "Commissioner of Patents, Washington, D. C."